US008391248B2

(12) United States Patent
Ferrato et al.

(10) Patent No.: US 8,391,248 B2

(45) Date of Patent: Mar. 5, 2013

(54) METHOD FOR EVALUATING THE PERFORMANCES OF A MOBILE TELEPHONY NETWORK

(75) Inventors: Marco Ferrato, Turin (IT); Daniele Franceschini, Turin (IT); Claudio Guerrini, Turin (IT); Michele Ludovico, Turin (IT); Enrico Zucca, Turin (IT)

(73) Assignee: Telecom Italia S.p.A., Milan (IT)

(*) Notice: Subject to any disclaimer, the term of this patent is extended or adjusted under 35 U.S.C. 154(b) by 1444 days.

(21) Appl. No.: 10/580,555

(22) PCT Filed: Nov. 28, 2003

(86) PCT No.: PCT/IT03/00787

§ 371 (c)(1), (2), (4) Date: May 26, 2006

(87) PCT Pub. No.: WO2005/053344

PCT Pub. Date: Jun. 9, 2005

(65) Prior Publication Data

US 2007/0014263 A1 Jan. 18, 2007

(51) Int. Cl.

| | |
|---|---|
| ***H04B 7/216*** | (2006.01) |
| ***H04J 1/16*** | (2006.01) |
| ***H04L 12/28*** | (2006.01) |
| ***G06F 15/16*** | (2006.01) |
| ***G06F 17/50*** | (2006.01) |
| ***H04W 24/00*** | (2009.01) |

(52) U.S. Cl. ........ 370/335; 370/253; 370/254; 370/342; 709/253; 455/423; 703/13

(58) Field of Classification Search .................. 370/335, 370/253, 254, 342

See application file for complete search history.

(56) References Cited

U.S. PATENT DOCUMENTS

| | | | | |
|---|---|---|---|---|
| 5,809,282 | A * | 9/1998 | Cooper et al. | 709/226 |
| 6,111,857 | A | 8/2000 | Soliman et al. | |
| 2002/0145982 | A1* | 10/2002 | Talpade et al. | 370/253 |
| 2003/0086405 | A1 | 5/2003 | Silva et al. | |

(Continued)

FOREIGN PATENT DOCUMENTS

| | | | |
|---|---|---|---|
| EP | 1 328 131 | A1 | 7/2003 |
| WO | 02/35872 | A1 | 5/2002 |

(Continued)

OTHER PUBLICATIONS

Leila Zurba Ribeiro "Traffic Dimensioning for Multimedia Wireless Networks", by Faculty of the Virginia Polytechnic Institute and State University, Published Apr. 17, 2003 Falls Church, VA.*

(Continued)

*Primary Examiner* — Wayne Cai

*Assistant Examiner* — Timothy Pham

(74) *Attorney, Agent, or Firm* — Finnegan, Henderson, Farabow, Garrett & Dunner, L.L.P.

(57) ABSTRACT

A method of evaluating the performance of a mobile telephone network having at least a first and a second simulation of a first and a second network configuration, respectively, which are statistically independent of each other. Each simulation includes the following steps: specifying a total number of users to be simulated; determining a sequence of activation of user blocks included in this total number of users to be simulated and indicating a traffic distribution; activating said user blocks in succession until the total number of users to be simulated is reached; and processing at least one radio resource management event relating to the traffic distribution associated with each currently activated user block. The simulations are repeated until a predetermined accuracy threshold is reached for each simulated network value.

32 Claims, 6 Drawing Sheets

Client Computer
Graphic Interface Program
Data Network
Configuration File
Database of Simulation Data
Data Processing Module
Simulator
Server Computer
Terrain Database

U.S. PATENT DOCUMENTS

2004/0111502 A1* 6/2004 Oates ............................ 709/223
2004/0127212 A1* 7/2004 Wang ............................ 455/423
2006/0149524 A1* 7/2006 Kalyanaraman et al. ....... 703/13

FOREIGN PATENT DOCUMENTS

WO WO 02/104055 A1 12/2002
WO WO 03/003775 A2 1/2003
WO WO 03/094538 A2 11/2003

OTHER PUBLICATIONS

Türke et al.; "Comparison of Different Simulation Approaches for cell Performance Evaluation," Deliverable D2.2, IST Project Momentum, pp. 1-50, (2002).

Holma et al.; "Radio Network Planning", WCDMA for UMTS, Radio Access for Third Generation Mobile Communications, Revised Edition, John Wiley & Sons, Ltd., pp. 149-159, (2001).

Hata; "Empirical Formula for Propagation Loss in Land Mobile Radio Services," IEEE Transactions on Vehicular Technology, vol. VT-29, No. 3, pp. 317-325, (1980).

3rd Generation Partnership Project; "Technical Specification Group Radio Access Network; Radio resource management strategies", (Release 5), 3GPP TR 25.922 V5.1.0, pp. 1-79, (2003).

3rd Generation Partnership Project; "Technical Specification Group Radio Access Networks; Radio Frequency (RF) system scenarios", (Release 6), 3GPP TR 25.942 V6.1.0, pp. 1-124, (2003).

* cited by examiner

METHOD FOR EVALUATING THE PERFORMANCES OF A MOBILE TELEPHONY NETWORK

CROSS REFERENCE TO RELATED APPLICATION

This application is a national phase application based on PCT/IT2003/000787, filed Nov. 28, 2003, the content of which is incorporated herein by reference.

BACKGROUND OF THE INVENTION

1. Field of the Invention

The present invention relates in a general way to the field of mobile telephony and particularly to a multi-service mobile telephone network. More particularly, the present invention relates to a method for evaluating the performance of a second or third generation mobile telephone network based, for example, on the CDMA standard, on the CDMA 2000 standard, on the W-CDMA standard or on the EDGE standard (evolution of the GSM/GPRS mobile telephone network).

2. Description of the Related Art

When planning a network, designers are required to predict the performance of the network on the basis of geographical, data, the network configuration and the expected demand for service. Tools which simulate the operation of a network provide a practical method for planning the network. Network planning tools enable-designers to simulate the operation of various network configurations, and to modify the network on the basis of statistical data obtained as a result of the simulation.

The UMTS cellular network planning tools available at the present time are mostly based on simulations of the static type.

U.S. Pat. No. 6,111,857 describes a network planning tool in which the simulation is performed by using a set of databases containing terrain and population information associated with the market area over which the wireless network is configured. To perform the simulation, a composite propagation loss matrix and a demand and service vector are generated using the terrain and population information, as well as the configuration of the wireless telecommunications network. When the composite propagation loss matrix and the demand and service vector have been generated, an analysis of the reverse link is performed. Subsequently, an analysis of the forward link is performed. During both the reverse and forward link analysis the multiple iterations of analysis are performed until a stable result is achieved. Upon completion of the reverse and forward link analysis, the results of the simulation are displayed in a graphical manner for examination.

WO 03/003775 describes a wireless network planning tool which simulates wireless network operation, including subscriber admission processing, based on sophisticated reverse and forward link analyses that include data fallback procedures. Subscribers are associated with an application type, where each application type preferably has maximum and minimum data rates and one or more fallback rates. During simulation, the tool may use the fallback when evaluating forward and reverse communication links between subscribers and their associated sectors (base stations). A subscriber unable to close a reverse link to a given sector at a given data rate may be re-evaluated at a lower rate under the “fallback” procedures. Forward link analysis incorporates similar fallback procedures in forward link call admission.

Additionally, EP 1328131 A1 describes a method and a system for planning and/or evaluation of cell capacity in (CDMA) radio networks comprising at least one base station which defines at least one cell. The estimate of the cell capacity in the uplink and the estimation of the cell capacity in the downlink are both carried out by adding an amount of traffic ($T_{BS1,1}$; $T_{BS2,2}$) to the cell until a value representing the limit capacity ($L_{min}$) is reached.

However, the applicant has observed that the performance of a mobile telephone network, for example a multi-service network, depends to a significant degree on the radio resource management (RRM) procedures and/or algorithms. This is because the radio resource management equipment included in the mobile telephone network require the use of a multiplicity of RRM procedures and/or algorithms, including, for example, those for admission control, congestion control, handover control, the control functions used when a user is in out-of-service conditions (“outage control”), the dynamic negotiation of the radio resource allocation, and power control. Moreover, the RRM procedures and/or algorithms may take into account, the various quality of service (QoS) requirements associated with the services.

The applicant has also observed that another fundamental aspect of the evaluation of the performance of a mobile telephone network is the characterization of the traffic imposed on the network by the various services involved. The traffic data are difficult to predict accurately, and are subject to extreme variability. In a process of planning and optimizing a mobile telephone network, therefore, it is often necessary, to evaluate the sensitivity of the network performance as a function of the variability of the traffic, and consequently to perform numerous simulations of the network to evaluate the impact of different traffic scenarios on the same network.

It is also known that there is a relationship between the simulation time and the accuracy of the simulation results. For example, in the case of a certain performance parameter of the network, the accuracy with which the network simulator can estimate this parameter depends on the number of statistic samples collected, and consequently on the duration of the simulation itself. A planning and optimization process may require the performance of a very large number of network simulations. Each simulation may, in turn, require the analysis of scenarios comprising a large number of users and base stations. The minimization of the simulation time is therefore a necessary condition for an efficient planning and optimization process.

On the other hand, there is a risk that such minimization may be carried out at the expense of the accuracy and reliability of the results of the simulations.

Dynamic simulators are generally used to evaluate the effect and/or impact of the RRM procedures and/or algorithms on the network performance and on network planning.

For example, WO 02/104055,in the name of the present applicant, describes a dynamic simulation system characterized by a modular structure based on interchangeable objects which can be selectively activated, and which comprise a simulation engine and a plurality of modules representing the equipment and elements of the network to be simulated. This structure enables the system to simulate highly complex networks.

However, the applicant has observed that the evaluation of the performance of a large network requires very long simulation times.

Recently, another simulation method has been proposed for evaluating the performance of a UMTS network on the basis of a short-term dynamic simulation (STD simulation) method, described for example in U. Türke, T. Winter, Ranjit Perera, E. Lamers, E. Meijerink, E. Fledderus and A. Serrador, "Comparison of different simulation approaches for cell performance evaluation", Deliverable D2.2, IST project MOMENTUM, Oct. 13, 2002.

Short-term dynamic simulations (STD simulations) can be used to investigate the impact of mobility and the presence of different service configurations and to check that the quality of service (QoS) requirements are met. These simulations provide a larger amount of data on the behaviour of the system by comparison with simulations of the purely static type, since they take into consideration important dynamic effects such as the time-dependency requirements of the bit rate of the uplink and downlink, the increase and decrease of performance associated with "non real-time" data traffic, and the mobility of users.

SUMMARY OF THE INVENTION

The applicant has tackled the problem of providing a method of evaluating the performance of a mobile telephone network which can be used to simulate, with adequate, accuracy and reliability, the radio resource management procedures and/or algorithms, while minimizing the time required for the simulation.

The applicant has also tackled the problem of providing a method of evaluating the performance of a mobile telephone network which can simulate a plurality of traffic scenarios in a single simulation, while providing adequate monitoring of the accuracy and reliability of the results.

The applicant has observed that the above problem can be resolved by a method of evaluating the performance of a mobile telephone network, comprising at least a first and a second simulation of a first and a second network configuration respectively, the simulations being statistically independent of each other (in other words, neither of the two network configurations is obtained from the other by evolution over time). Each simulation comprises the following steps: specifying a total number of users to be simulated, $N_{UETOT}(s)$; determining a sequence of activation of user blocks $N_{UESTEP}(s)$, included in this, total number of users to be simulated $N_{UETOT}(s)$ and indicating a traffic distribution; activating these user blocks in succession until the total number of users to be simulated, $N_{UETOT}(s)$, is reached; and processing at least one radio resource management event relating to the traffic distribution associated with each currently activated user block. The simulations are repeated until a predetermined threshold of accuracy is reached for each size of network simulated.

More specifically, a method of evaluating the performance of, a mobile telephone network comprises the steps of:

- simulating a first configuration of said mobile telephone network;
- simulating a second configuration of said mobile telephone network;

said first and second configurations of said mobile telephone network being statistically independent of each other;

each of said simulation steps comprising the steps of:

- specifying a total number of users to be simulated, $N_{UETOT}(s)$;
- determining a sequence of activation of user blocks included in this total number of users to be simulated;
- activating these user blocks in succession until said total number of users to be simulated is reached, each user block indicating a traffic distribution; and
- processing at least one radio resource management event relating to the traffic distribution associated with each currently activated user block, Another aspect of the present invention relates to equipment for simulating at least a first and a second configuration of a mobile telephone network, said first and second configurations of said mobile telephone network being statistically independent of each other, and each comprising a total number of users to be simulated, said simulation equipment including:

- at least one object representing a network controller belonging to said mobile telephone network; said at least one object comprising:
  - first modules for determining a sequence of activation of user blocks included in said total number of users to be simulated;
  - second modules for activating said user blocks in succession until said total number of users to be simulated is reached, each user block indicating a traffic distribution; and
  - third modules for processing at least one radio resource management event relating to the traffic distribution associated with each activated user block.

A further aspect of the present invention relates to a software product which can be loaded into the memory of at least one electronic computer and which comprises portions of software code for implementing the procedure according to the invention when the product is executed on a computer: in this context, this wording is to be considered wholly equivalent to the mention of a computer-readable, means comprising instructions for controlling a computer network in order to implement a procedure according to the invention. The reference to "at least one electronic computer" is clearly intended to point out the possibility of implementing the solution according to the invention in a decentralized environment.

Further preferred aspects of the present invention are described in the dependent claims and in the present description.

BRIEF DESCRIPTION OF THE DRAWINGS

The characteristics and advantages of the present invention will be made clear, by the following description of one embodiment, provided by way of example and without restrictive intent, with reference to the attached drawings, in which.

DETAILED DESCRIPTION OF THE INVENTION

Figure 1:
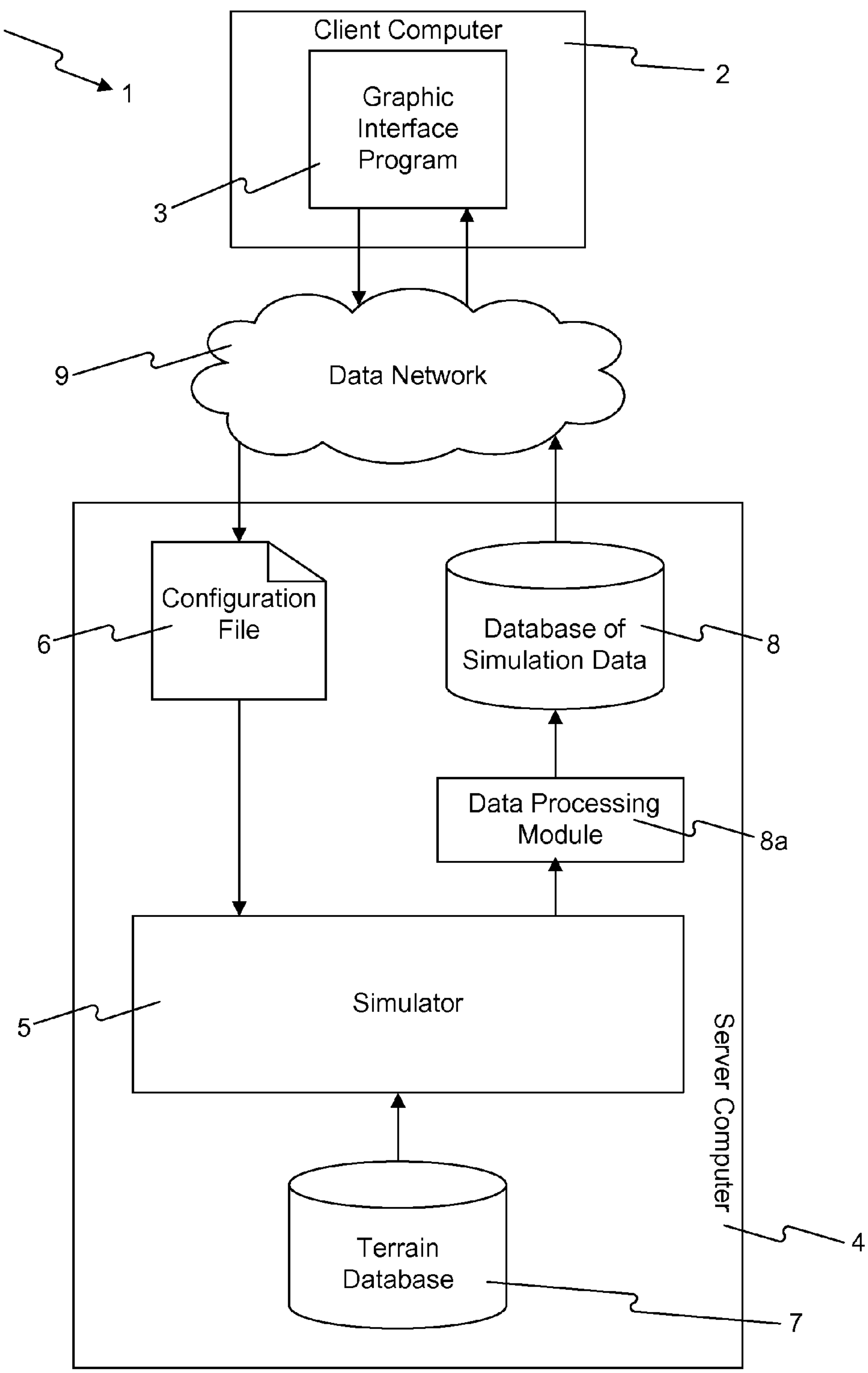
FIG. 1 shows a client-server architecture for the operation of the method of evaluating the performance of a mobile telephone network, for example a multi-service network, according to the invention.

With reference to FIG. 1, the method for evaluating the performance of a mobile telephone network according to the invention can operate by means of a client-server architecture 1, of a known type, described below. By way of example and without restrictive intent, the multi-service mobile telephone network to which reference will be made in the rest of the present description is a third generation multi-service-network with radio access of the WCDMA type, compatible with the UMTS standard. However, the evaluation method according to the invention is also applicable to second or third generation networks based, for example, on the CDMA 2000 standard or on the EDGE standard (evolution of the GSM/GPRS network).

Also with reference to FIG. 1, the client-server architecture 1 comprises: a client computer 2, for example a personal computer, in which a graphic interface program 3 of a known type is installed; a server computer 4, for example a Work Station, in which is installed a simulator 5 of the static type, for evaluating the performance of the multi-service mobile telephone network to be examined.

Specifically, the simulator receives at its input:

- a configuration file 6 comprising a set of network configuration parameters, listed below in the present, description, which describe the characteristics of the multi-service mobile telephone network. The network configuration parameters are defined by the mobile telephone operator, using the graphic interface program 3;
- a structured set of terrain data, listed below in the present description, and retrieved from a terrain database 7;
- a set of statistical data, listed below in the present description, which describe the performance of the multi-service mobile telephone network. These statistical data are then stored, in a structured way, in a database of the simulation data 8, and are subsequently sent to the graphic interface program 3 which displays them.

As shown in FIG. 1, the client computer 2 and the server computer 4 are interconnected by a data network 9, of a known type, based for example on a TCP/IP protocol. Alternatively, the client computer 2 and the server computer 4 can be combined in a single computer.

The network configuration parameters included in the configuration file 6 can include, for example,

- the number of cells making up the multi-service mobile telephone network;
- the geographical positions of said cells;
- the numbers of transceiver stations (nodes B according to the UMTS standard) present in the network;
- the identification of the cells associated with each node B;
- the characteristics of each node B, such as the antenna gain, the radiation pattern, the direction of maximum radiation (defined in terms of azimuth and tilt), the noise figure of the receiver, the antenna connection losses and the transmission powers of the common channels;
- the characteristics of the mobile terminals to be simulated, such as the noise figure of the receiver incorporated in each mobile terminal, the gain and losses associated with the terminal antenna, the maximum transmission power available for the uplink, and the power dynamics of the mobile terminal;
- the characteristics of the various services supported by the network, such as the class of service (which indicates in a summary way the quality requirements associated with the service); the set of transport formats associated with the service; the set of activity factors which describe in statistical terms the behavior of the mobile terminal using the service;
- the control parameters for the radio resource management procedures and/or algorithms (RRM algorithms), comprising, for example, the thresholds of macrodiversity, in other words the capacity for maintaining the current call between a mobile terminal and the mobile telephone network via more than one transceiver station; the admission control thresholds, in other words the thresholds beyond which a mobile terminal requiring a given service cannot be admitted into the network; and the congestion control thresholds, in other words the thresholds beyond which conditions of "overload" occur, these being conditions in which the network is not capable of meeting the requirements of the connected mobile terminals while maintaining the quality requirements associated with the various services.

It should be made clear that the time variable is not taken into account in the static simulations, but the by taking a snapshot. By conducting a plurality of analyses (taking a plurality of "snapshots") of the network in different situations, it is possible to obtain a global evaluation of the network. Consequently, the static simulation according to the invention does not generally include radio resource management parameters which represent "times" (where time is considered to be an independent variable), for example the radio protocol timers and the temporal hysteresis.

Furthermore, the terrain data stored in the terrain database 7 and associated with the area over which the multi-service mobile telephone network is configured can comprise, for example,

- a traffic matrix of a known type, whose elements indicate the expected traffic for each terrain element (pixel) making up a single cell, and for each service supplied by the multi-service mobile telephone network, defined for example on the basis of one of the approaches described in WO 02/35872.
- an altitude matrix, of a known type, whose elements indicate the mean attitude above sea level of each terrain element;
- a morphology matrix of a known type, whose elements indicate the morphology of each terrain element; and
- a building matrix of a known type, whose elements indicate the percentage of building present in each terrain element.

Additionally, the statistical data obtained at the output of the simulator 5 and stored in the database of the simulation data 8 can comprise, for example,

- the total received wideband power for each cell, defined for example according to the 3GPP 25.115 specification;
- a noise factor (NR) associated with each cell and defined by the following known expression:

$$NR = \frac{RTWP}{NF \cdot W \cdot kT}$$

where RTWP denotes the total power received over the uplink by the cell; NF denotes the noise figure at the receiver of the cell; W is the bandwidth of the WCDMA relative to the cell, and kT is the power spectral density of the thermal noise;

- the load factor for the uplink associated with each cell and calculated according to the following known expression:

$$\eta = 1 - \frac{1}{NR}$$

- the estimated noise factor found for the uplink from the number of links associated with each cell, calculated on the basis of the following known expression:

$$\overline{\eta_{UL}} = \sum_{s=1}^{Nserv} N(s) \cdot \chi_{UL}(s)$$

where N(s) denotes the number of active links associated with the cell for the service s, $N_{serv}$ denotes the number of services and $\chi_{UL}(s)$ denotes the load associated with the individual link, estimated for the uplink, for example, by means of the expressions published in Holma, Toskala, "WCDMA for UMTS", Wiley, 2001;

- the total power transmitted by each cell, defined for example according to the 3GPP 25.115 specification;
- the power transmitted by each cell in each traffic channel, defined for example according to the 3GPP 25.115 specification;
- the percentage of mobile terminals out of service for each terrain element;
- the total number of "spreading" codes required for each cell, calculated, for example, by considering the value of the "spreading factor" parameter which characterizes each transport format, according to the orthogonal variable spreading factor (OVSF) method described in the 3GPP 25.213 specification;
- the estimated load factor found for the downlink from the number of links associated with each cell, calculated on the basis of the following known expression:

$$\overline{\eta_{DL}} = \sum_{s=1}^{Nserv} N(s) \cdot \chi_{DL}(s)$$

where N(s) denotes the number of active links associated with the cell for the service s, $N_{serv}$ denotes the number of services and $\chi_{DL}(S)$ denotes the load associated with the individual link, estimated for the downlink, for example, by means of the expressions published in Holma, Toskala, "WCDMA for UMTS", Wiley, 2001.

Figure 2:
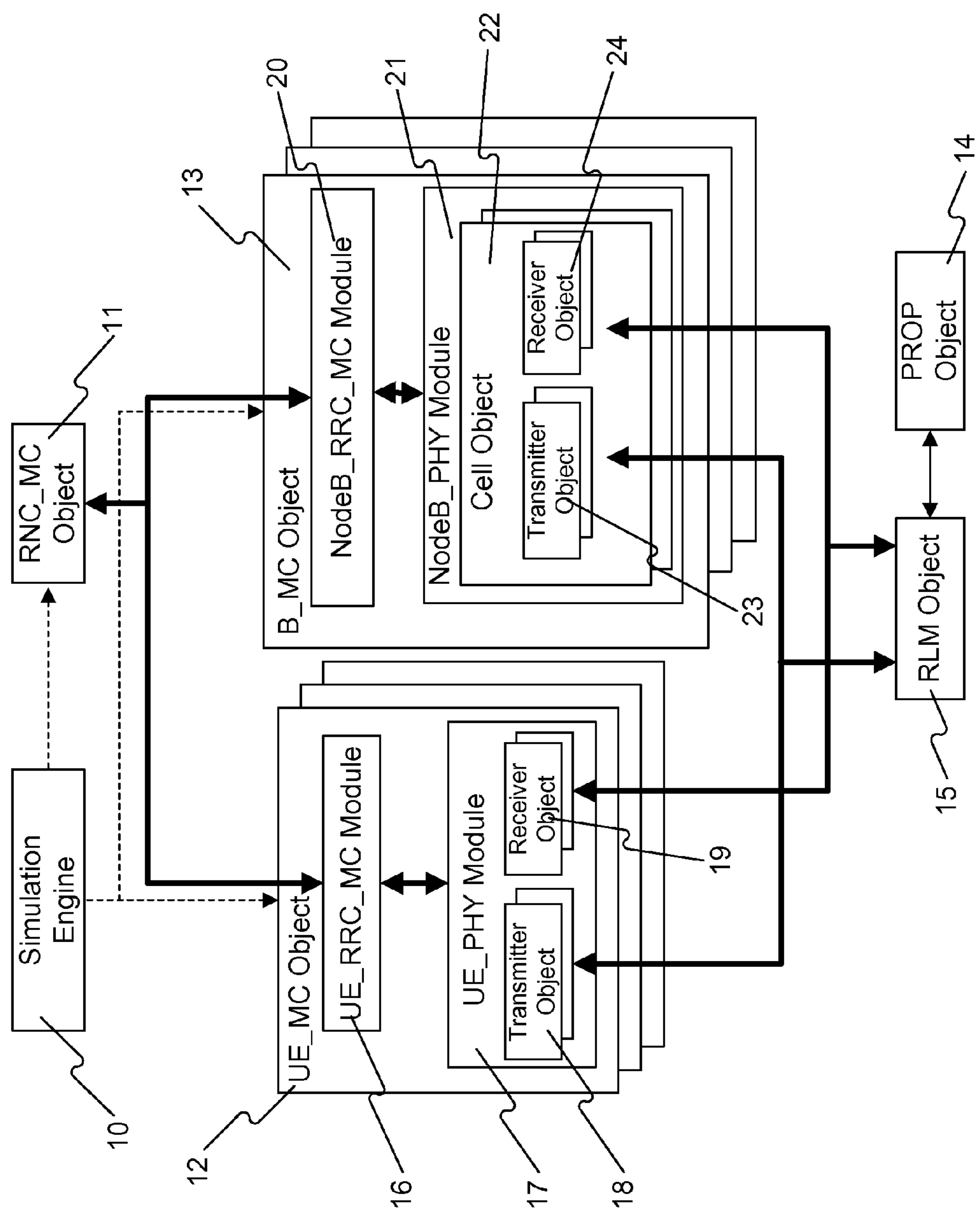
FIG. 2 shows simulation objects used in the evaluation method according to the invention.

With reference to FIG. 2, the simulator 5, developed for example in C++ programming language by means of a design platform of the UML ("Unified Modelling Language) type, comprises, in what is known as an object-oriented approach:

- a simulation engine 10, comprising modules, described below, for managing and developing the simulation;
- an object of the RNC_MC type, indicated by reference number 11, comprising modules, described more fully in the following part of the present description, which simulate the behaviour of a radio network controller. In a mobile telephone network, the network controllers manage the radio resources and control the radio transport;
- a plurality of objects of the UE_MC type, indicated by reference number 12, each comprising modules, described below, which simulate the behaviour of a mobile terminal. Each UE_MC object is also associated with a reference service belonging to a service class selected, for example, from those listed in the 3GPP specifications and indicated by the terms "Conversational", "Streaming", "Interactive", and "Best Effort";
- a plurality of objects of the Node B_MC type, indicated by reference number 13, each comprising modules, described below, which simulate the behavior of a transceiver station (node B) and of the UMTS cells associated with it. This is because each node B can supervise a variable number of UMTS cells, each of which is associated with a transmitter and a receiver;
- an object of the PROP ("Propagation Module") type, indicated by reference number 14 and described in detail in the following part of the present description;
- an object of the RLM ("Radio Link Monitor") type, indicated by reference number 15 and described in detail in the following part of the present description.

In the object-oriented approach, the elementary unit of analysis is not an operation (procedure) but an object, in the sense of an aggregation of variables, data structures and procedures, considered as a single entity in the context of the simulator. In the present case, the simulation objects are generally models of real entities (objects in the real world).

In greater detail, the simulation engine 10 comprises the following modules, not shown in FIG. 2:

- a first module, implemented for example in a similar way to the "Parameters manager" module described in WO 02/104055, which reads and interprets the network configuration parameters contained in the configuration file 6 and makes this information available for the creation of the simulation objects in the initialization step of the simulation;
- a second module, implemented for example in a similar way to the "Factory Manager" module described in WO 02/104055, which optimizes the memory allocation of the simulation objects;
- a third module acting as an event scheduler, implemented for example in a similar way to the "Event Scheduler" module described in WO 02/104055, which establishes the sequence of execution of the simulation steps and, more particularly, the sequence in which the radio resource management events are processed; at least one radio resource management procedure and/or algorithm being implemented in each radio resource management event;
- a fourth module, implemented for example in a similar way to the "Statistic Manager" module described in WO 02/104055, which manages modules for collecting and processing the simulation results.

Additionally, the PROP object 14 comprises a module which determines a set of attenuation values (one for each cell of the network under examination) for each terrain element included in the mobile telephone network under examination. The attenuation is calculated from the terrain data by combining a deterministic component and a statistical component. The deterministic component can be calculated, for example, by the known method of Okumura Hata described in M. Hata, "Empirical Formula for Propagation Loss in Land Mobile Radio Services", IEEE Transactions on Vehicular Technologies, 1980, while the statistical component can be calculated by using a pseudo-random number generator of a known type, based for example on the method described in G. Marsaglia, K. Ananthanarayanan and N. Paul, Random Number Generator Package—'*Super Duper*', School of Computer Science, McGill University, Montreal, Canada, 1973. In this case, the statistical component is simulated as a random variable having lognormal distribution, as specified in the document ETSI 30.03.

The RLM object 15 comprises a module which calculates the interference levels, and consequently the signal/noise ratios for each link. Specifically, a link is an association between one of the receivers present in the mobile telephone network under examination and belonging to a UE_MC object 12 or a NodeB_MC object 13, and one of the transmitters, also belonging to a UE_MC object 12 or a NodeB_MC object 13. In particular, an "uplink" is a link between a transmitter associated with a mobile terminal and a receiver associated with a cell belonging to a Node B while a "downlink" is a link between a transmitter associated with a cell belonging to a Node B and a receiver associated with a mobile terminal.

Additionally, the principle of macrodiversity, specified by the UMTS standard, requires that, for an uplink, it should be possible to associate a single transmitter at the mobile terminal with a plurality of receivers belonging to different cells and possibly to different Nodes B. The principle of macrodiversity also requires that, for a downlink, it should be possible to associate a receiver at the mobile terminal with a plurality of transmitters belonging to different cells and, possibly, to different Nodes B. The transmitter-receiver associations are determined in the initial steps of the simulation by macrodiversity management algorithms, as stated in the 3GPP document 25.922.

In detail, for each transmitter-receiver link, the RLM object 15 determines the useful signal $C_i$ according to the following known expression:

$$C_i = P_i \cdot A_{i,i}{}^5$$

where $P_i$ denotes the power transmitted by the transmitter associated with the receiver in question, while $A_{i,i}$ denotes the attenuation associated with the transmitter-receiver link and calculated from the PROP object 14 on the basis of the terrain element in which the mobile terminal in question is located.

The interference is calculated according to the following known expression:

$$I_i = \sum_{j \neq i} P_j \cdot A_{i,j} \cdot ACIR_{i,j}$$

where the summation is extended to all the transmitters except that associated with the receiver in question, these transmitters being called interferers. $P_j$ denotes the power of the single interferer, $A_{i,j}$ denotes the attenuation associated with the link between the receiver i in question and the interferer j, and $ACIR_{i,j}$ denotes the additional attenuation present in the case in which the receiver i and the transmitter j operate at different frequencies. The additional attenuation $ACIR_{i,j}$ is calculated from the following known expression:

$$ACIR_{i,j}(f_i, f_j) = \frac{1}{(ACS_i(f_i, f_j))^{-1} + (ACLR_j(f_i, f_j))^{-1}}$$

where $ACS_i$ and $ACLR_j$ denote, respectively, the "adjacent channel selectivity" parameter and the "adjacent channel loss ratio" parameter. These two parameters are defined according to the characteristics of the receiver i and the transmitter j as a function of the frequencies $f_i$ and $f_j$ associated with them, according to the definitions in the 3GPP document 25.942.

The signal/noise ratio associated with the link i is calculated by using the following known expression:

$$SNR_i = \frac{C_i}{I_i + NF \cdot W \cdot kT}$$

where NF is the noise figure of the receiver of the cell, W is the bandwidth of the WCDMA channel for the cell, and kT is the power spectral density of the thermal noise. Additionally, in the presence of macrodiversity, the calculation of the signal/noise ratio is modified to allow for the effect of signal recombination associated with the different links. In accordance with the UMTS standard, this recombination is simulated in different ways for the uplink and the downlink.

In detail, in the case of the downlink, the following known expression is used to determine the total signal/noise ratio from the signal/noise ratios of the individual links:

$$\left.\frac{C}{I}\right|_{TOT} = \sum_i \frac{C_i}{I_i}$$

where the summation is extended to the set of links in macrodiversity mode;

In the case of the uplink, however, it is necessary to distinguish between the conditions of:

- softer handover: the mobile terminal is in macrodiversity mode and is located in an area of overlap between cells associated with the same Node B. The recombination model is similar to that described for the downlink.
- soft handover: the mobile terminal is in macrodiversity mode and is located in an area of overlap between cells associated with different Nodes B. The signals associated with the different links are recombined by the network controller (RNC) which selects the link which provides the best quality in terms of BLER (BLock Error Rate). In the simulation, the RLM object 15 calculates a signal/noise ratio for each of the links in macrodiversity mode, leaving the RNC_MC object 11 to carry out the recombination.

Again with reference to FIG. 2, according to the invention, the UE_MC objects 12 comprise:

- a first module UE_RRC_MC 16 which simulates the functions of the RRC ("Radio Resource Control") protocol level of the UMTS mobile telephone network and the subset of radio resource management functions to be provided by the mobile terminal (described more fully in the following part of the present description);
- a second module UE_PHY 17 which simulates the first protocol level or physical level of the mobile terminal, and comprises a plurality of objects of the transmitter type 18 and receiver type 19, according to the UMTS standard.

Specifically, the principal operations executed by the first UE_RRC_MC module 16 can be summarized as follows:

- configuration of the parameters associated with the first protocol level or physical level of the UMTS mobile telephone network according to the characteristics of the service associated with the mobile terminal
- interfacing with a first module NodeB_RRC_MC 20, incorporated in the NodeB_MC object 13 and described below, for implementing the power control procedures specified by the UMTS standard;
- interfacing with the RNC_MC object 11 for implementing the RRM procedures and/or algorithms associated with the various radio resource management events.

According to the invention, the NodeB_MC objects 13 comprise:

- the first module, NodeB_RRC_MC 20, which simulates the functions of the RRC ("Radio Resource Control") protocol level of the UMTS mobile telephone network and the subset of the radio resource management functions to be provided by the Node B (described more fully in the following part of the present description);
- a second module, NodeB_PHY 21, which simulates the physical level of the Node B and comprises a plurality of objects of the cell type 22. Each object of the cell type 22 comprises a plurality of objects of the transmitter type 23 and receiver type 24, according to the UMTS standard.

Specifically, the principal operations executed by the first NodeB_RRC_MC module 20 can be summarized as follows:

configuration of the common channels (according to the UMTS standard) for the cells controlled by each Node B;

interfacing with the first module UE_RRC_MC 16 for implementing the power control procedures specified by the UMTS standard;

interfacing with the RNC_MC object 11 for implementing the RRM procedures and/or algorithms associated with the various radio resource management events.

Figure 3:
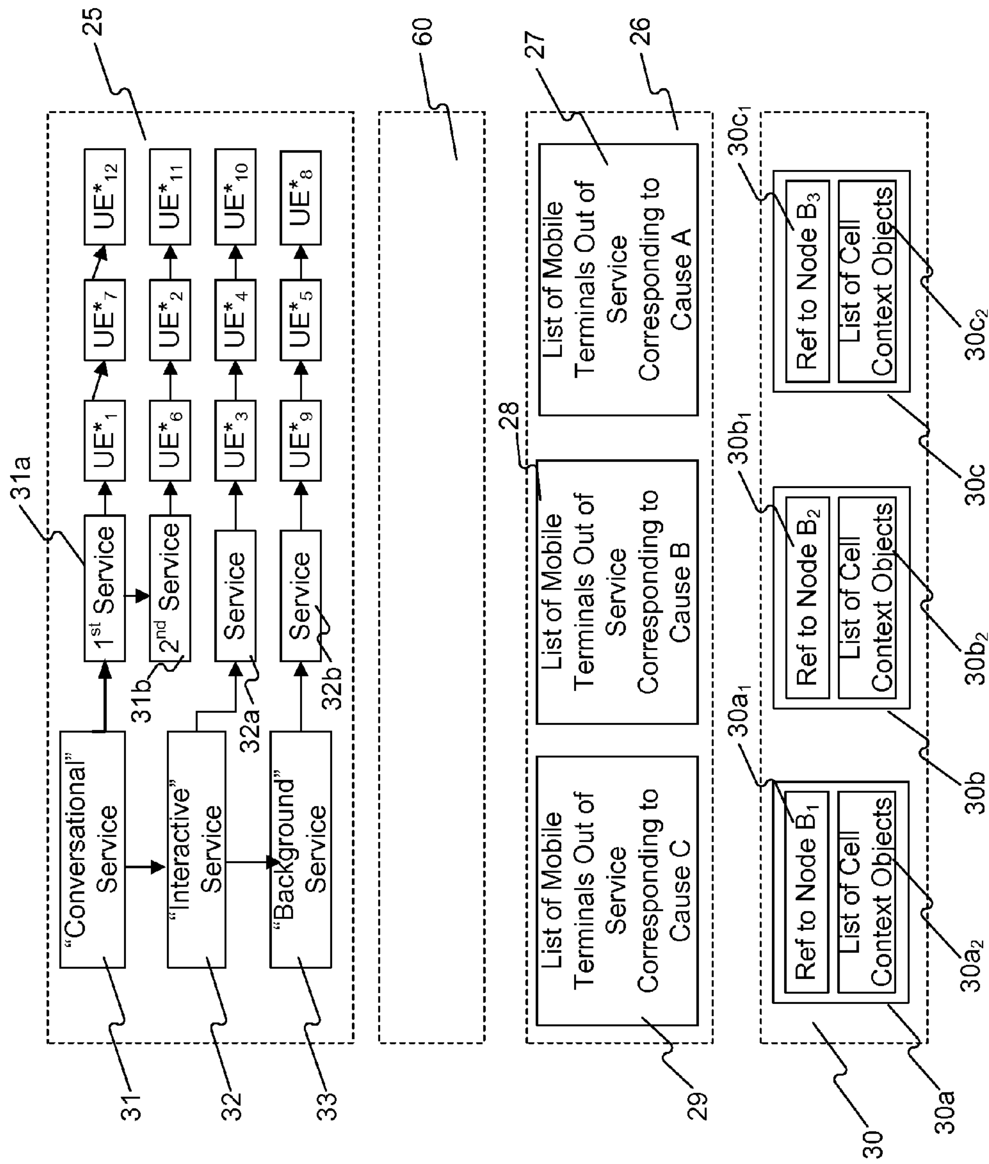
FIGS. 3 and 4 show data structures used in the, evaluation method according to the invention.

As shown in FIG. 3, according to the invention, the RNC_MC object 11 comprises data structures which support the radio resource management operations.

Specifically, the RNC_MC object 11 includes:

a list of activatable mobile terminals 25, structured by service class and by service;

a list of active mobile terminals 60, structured by service class and by service in a way which is entirely similar to that described for the list of mobile terminals to be activated 25; and therefore not shown in detail in FIG. 3; and a set 26 of lists of mobile terminals out of service, one for each cause of outage.

a map of the system resources 30.

As shown in FIG. 3, the list of mobile terminals to be activated 25 can, for example, comprise twelve references to UE_MC objects 12, indicated respectively as $UE^*_{1-12}$, and can be structured in three service classes and four services; in particular, the references $UE^*_1$, $UE^*_7$, $UE^*_{12}$ correspond to mobile terminals associated with a first service, indicated by the reference number 31*a*, which belongs for example to the "Conversational" service class, indicated by the reference number 31;

the references $UE^*_6$, $UE^*_2$, $UE^*_{11}$ correspond to mobile terminals associated with a second service, indicated by the reference number 31*b*, which belongs for example to the "Conversational" service class 31;

the references $UE^*_3$, $UE^*_4$, $UE^*_{10}$ correspond to mobile terminals associated with a service, indicated by the reference number 32*a*, which belongs for example to the "Interactive" service class, indicated by the reference number 32;

the references $UE^*_9$, $UE^*_5$, $UE^*_8$ correspond to mobile terminals associated with a service, indicated by the reference number 33*a*, which belongs for example to the "Background" service class 33.

Again with reference to FIG. 3, the set 26 can comprise, for example, three lists of references to mobile terminals which are out of service, indicated by the reference numbers 27, 28 and 29 respectively. Each of the lists of mobile terminals out of service 27, 28 and 29 is structured by service class and by service in a wholly similar way to that described for the list of mobile terminals to be activated 25.

In the example shown in FIG. 3, the lists of mobile terminals out of service 27, 28 and 29 can be associated with three different causes of outage, indicated by A, B, and C respectively. In particular, the list of mobile terminals out of service 27 can correspond to cause A, the list of mobile terminals out of service 28 can correspond to cause B, and the list of mobile terminals out of service 29 can correspond to cause C.

There may be multiple causes of outage. They are detected by the radio resource management procedures and/or algorithms. For example, a mobile terminal may be out of service because of lack of coverage, or because of the admission control procedures and/or algorithms, or the congestion control procedures and/or algorithms or the outage control procedures and/or algorithms.

Additionally, the map of the system resources 30, according to the invention, comprises a plurality of structures, each corresponding to a node B of the network under examination. Each structure comprises a reference to a Node B and a list of objects of the Cell Context type, one for each cell controlled by the Node B.

In particular, in the example shown in FIG. 3, the map of system resources 30 comprises three structures indicated by the reference numbers 30*a*, 30*b* and 30*c* respectively and corresponding to three objects of the NodeB_MC type 13 respectively. In greater detail, the structure 30*a* comprises a reference $\mathbf{30}a_1$ to the Node $B_1$ and a list of Cell Context objects $\mathbf{30}a_2$ associated with the cells controlled by the Node $B_1$; the structure 30*b* comprises a reference $\mathbf{30}b_1$ to the Node $B_2$ and a list of Cell Context objects $\mathbf{30}b_2$ associated with the cells controlled by the Node $B_2$; the structure 30*c* comprises a reference 30*c*, to the Node $B_2$ and a list of Cell Context objects $\mathbf{30}c_2$ associated with the cells controlled by the Node $B_3$.

Figure 4:
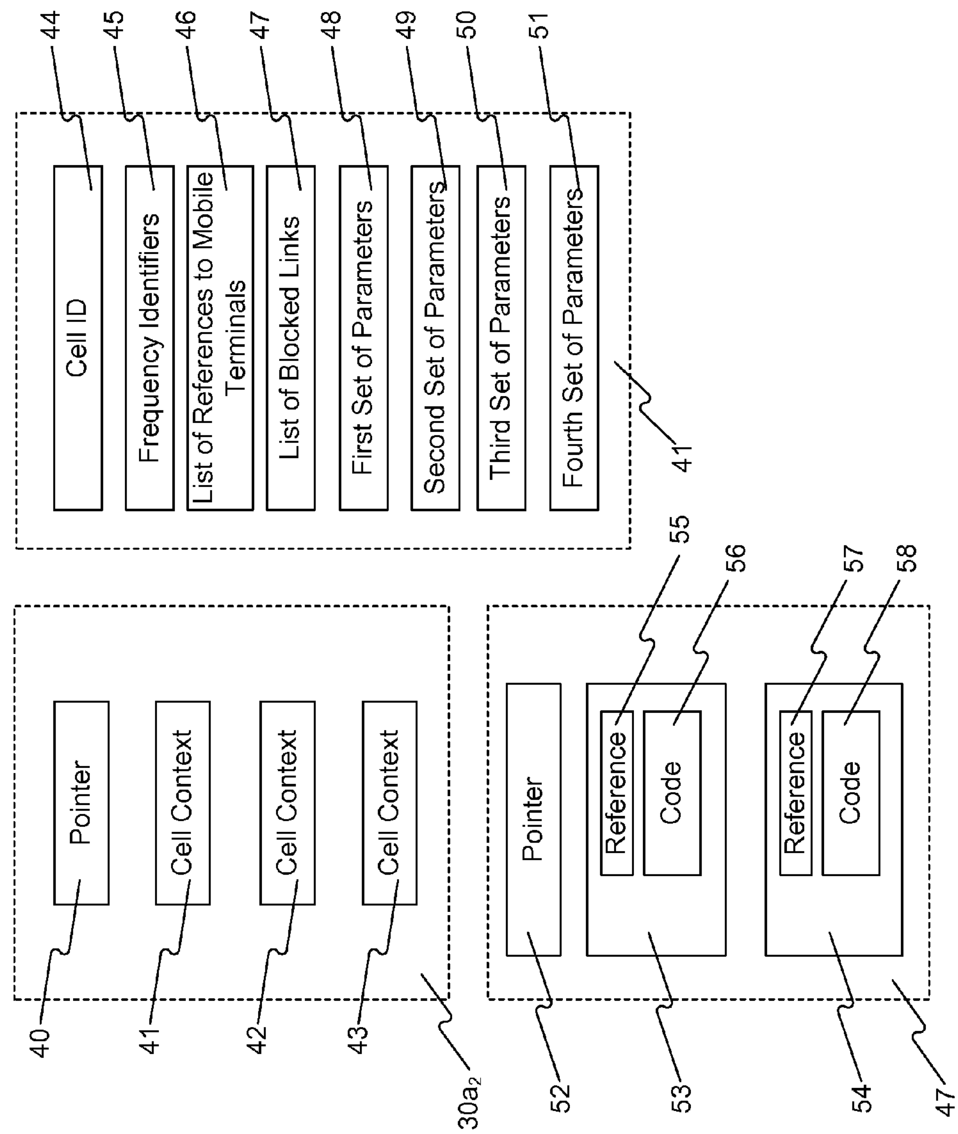

FIG. 4 shows an example of a list of Cell Context objects.

As shown in FIG. 4, each list of Cell Context objects, for example the list $\mathbf{30}a_2$ comprises a pointer 40 to the list and three Cell Context (41, 42, 43) corresponding to three cells controlled by a single Node B.

Each Cell Context object, for example the Cell Context object 41, comprises:

a cell identification code 44 (Cell ID);

frequency identifiers 45 for the frequencies used by the cell for transmission (downlink) and reception (uplink);

a list of references to mobile terminals 46, comprising mobile terminals which are operating in macrodiversity mode with the cell. The list of references to mobile terminals 46 is structured by service class and by service, in a way wholly similar to that specified for the list of mobile terminals to be activated 25;

a list of blocked links 47, comprising an indication of the links of the cell which have been blocked and an indication of the cause of blocking for each blocked link;

a first set of parameters 48 relating to the radio resource management in the uplink. For example, the first set of parameters 48 can comprise the following known parameters: the load threshold for the admission control (differentiated by service or by class of service if required); the load threshold for the admission control relating to mobile terminals in macrodiversity mode (differentiated by service or by class of service if required); the load threshold for the congestion control (differentiated by service or by class of service if required); the terminal power threshold for the outage control and the signal/noise ratio threshold for the outage control;

a second set of parameters 49 relating to the radio resource management in the downlink. For example, this second set of parameters 49 can comprise the following known parameters: the load threshold for the admission control (differentiated by service or by class of service if required); the load threshold for the admission control relating to mobile terminals in macrodiversity mode (differentiated by service or by class of service if required); the load threshold for the congestion control (differentiated by service or by class of service if required); the maximum number of codes that can be allocated; the power, threshold for the admission control, differentiated by service or by class of service if required; the power threshold for the admission control relating to mobile terminals in macrodiversity mode (differentiated by service or by class of service if required): and the power threshold for the congestion control (differentiated by service or by class of service if required);

a third set of parameters 50 relating to the load indicators of the uplink. For example, the third set of parameters 50 can comprise the following known parameters: the uplink load, calculated from the number of links of the cell; the downlink load, calculated from the noise rise factor;

a fourth set of parameters 51 relating to the load indicators of the downlink. For example, this fourth set of parameters 51 can comprise the following known parameters: the downlink load, calculated from the number of links of the cell; the total number of codes allocated; and the total power transmitted in the downlink.

Additionally, FIG. 4 shows an example of a list of blocked links 47 relating to one cell with, for example, two blocked links corresponding to two separate mobile terminals.

In the example shown in FIG. 4, the list of blocked links 47 comprises a pointer 52, a first object 53 comprising information on the first blocked link and a second object 54 which comprises information on the second blocked link.

Specifically, the first object 53 comprises a reference 55 to a first blocked mobile terminal and a code 56 indicating the cause of blocking of the link, while the second object 54 comprises a reference 57 to a second blocked mobile terminal and a code 58 indicating the cause of blocking of the link.

It should be pointed out that possible causes of blocking of a link may be:

poor reception quality of the pilot channel;

poor reception quality of the synchronization channel;

blocking by the admission control procedures based on the maximum number of links per cell;

blocking by the admission control procedures based on the maximum load factor per cell in the uplink;

blocking by the admission control procedures based on the maximum transmitted power per cell in the downlink;

blocking by the admission control procedures based on the maximum number of codes allocated per cell in the downlink;

blocking by the load control procedures based on the maximum load factor per cell in the uplink;

blocking by the load control procedures based on the maximum power transmitted per cell in the downlink;

outage blocking based on the control of the maximum available power associated with the mobile terminal;

outage blocking based on the control of the minimum signal/noise ratio in the uplink;

outage blocking based on the control of the minimum signal/noise ratio in the downlink.

Figure 5:
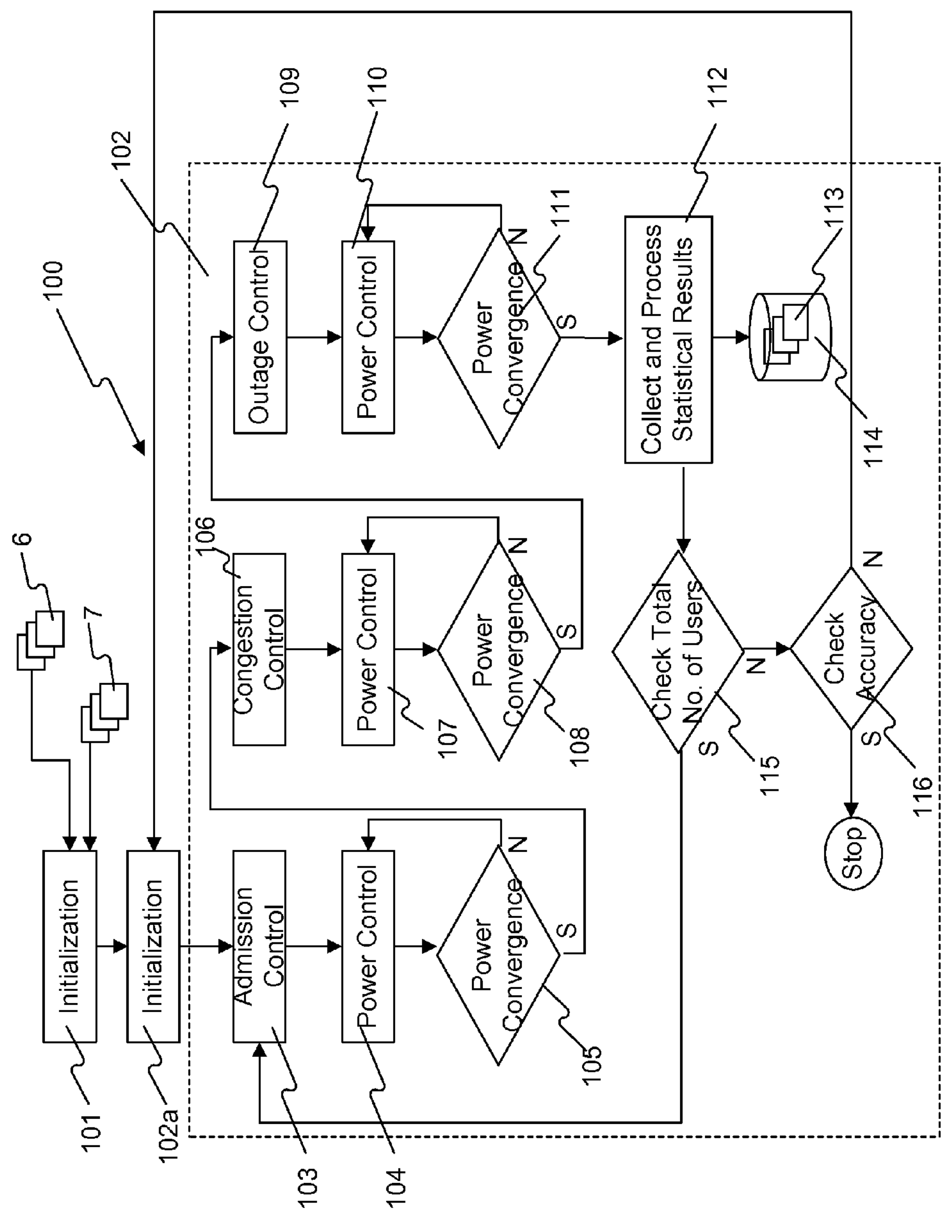
FIGS. 5 and 6 show flow diagrams relating to the evaluation method according to the invention.

The method according to the invention will now be described with reference to the flow diagram shown in FIG. 5. In detail, the flow diagram of FIG. 5 represents a simulation algorithm 100 which operates according to the invention.

It should be noted that the development of the simulation algorithm 100 depends on the simulation engine 10 which controls the sequences of simulation steps which make up the algorithm.

Additionally, during each simulation step, each simulation object participates in the determination of the development of the simulation by interacting directly with the other objects, by sending information elements called "messages".

Specifically, the message communication system is characterized in that the reception of the information by the target object takes place simultaneously with the sending by the source object.

In detail, the simulation algorithm 100, according to the invention, comprises a step of initialization of the simulation 101 and one or more iterative steps of event-based micro-simulation 102.

In each step of event-based micro-simulation 102 a network configuration is simulated, and all the network configurations simulated in the course of the simulation are statistically independent of each other.

In the following part of the present description and claims, the term "statistically independent" denotes that neither of two network configurations simulated in two successive event-based micro-simulations is the temporal evolution of the other.

Additionally, the analysis of one or more traffic distributions is provided in each step of event-based micro-simulation 102. Each step of event-based micro-simulation 102 also comprises one or more iterative steps of processing radio resource management events.

In particular, the radio resource management (RRM) comprises the set of procedures and/or algorithms for managing the radio resources. The RRM procedures comprise, for example, handover control, power control, admission control, congestion control, outage control, etc.

More specifically, the handover procedure is necessary for the management of the mobility of users when they move from the coverage area of one cell to another. Power control is required for minimizing the interference level on the radio interface and for ensuring the quality of the requested service. Admission control is required for verifying that the acceptance of a new link does not cause a reduction in the planned coverage area for a single cell, or a reduction of the quality of existing links. Congestion control is required for detecting an overload condition and subsequently returning the network to the load value which was specified when the network was planned.

For example, for a multi-service mobile telephone network based on the UMTS standard, the RRM procedures and/or algorithms, are implemented in the RRC (Radio Resource Control) network level of the radio access network (UTRAN: UMTS Radio Access Network). This level has the function of supervising and coordinating the functionality present in the other network levels (MAC: Medium Access Control, RLC: Radio Link Control, and the physical level), for correct and efficient use of the channels made available by the physical level.

In detail, the step of initialization of the simulation 101 comprises the following steps executed by the simulation engine 10:

reading the parameters in the configuration file 6;

creating the simulation objects on the basis of the network configuration parameters read from the configuration file 6. More specifically, the simulation engine 10 generates the NodeB_MC objects 13, the RNC_MC objects 11, the RLM objects 15, the PROP objects 14 and the UE_MC objects 12. These objects are divided into subsets corresponding to the different values of network configuration parameters associated with them.

In particular, different subsets can correspond, for example, to different services, or to different propagation conditions. For example, it is possible to simulate the presence in the network under examination of mobile terminals requiring different services, and, for each service, to simulate the presence of mobile terminals located inside buildings, in other words mobile terminals characterized by additional attenuation not specified by the PROP object 14 and due to the buildings themselves.

The configuration file 6 specifies, for each service, the possible transport formats to be used and the characteristic parameters of each transport format, for both the uplink and the downlink.

By way of example and without restrictive intent, we may cite the following characteristic parameters of the transport format relating to the uplink:

the transmission bit rate;

the target signal/noise ratio;

the parameters determining the distribution of the transmitted power between the physical data channel; which carries the user information, and the physical transport channel; and the load estimate associated with each uplink used in the admission control step.

The transport formats for the uplink are stored in a list in order of decreasing bit rate, associated with each UE_MC module 12 and defined in the configuration file 6.

By way of example and without restrictive intent, we may cite, the following characteristic parameters of the transport format relating to the downlink:

the transmission bit rate;

the target signal/noise ratio;

the spreading factor which determines the number of codes allocated over the serving cells;

the parameters determining the distribution of the transmitted power between the physical data channel, which carries the user information, and the physical transport channel; and the power estimate associated with each downlink used in the admission control step.

The transport formats for the downlink are stored in a list in order of decreasing bit rate, associated with each UE_MC module 12 and defined in the configuration file 6.

The step of initialization of the simulation 101 also comprises the following steps executed by the PROP object 14 and by the NodeB_MC object 13 respectively:

calculation of the propagation data, using the information retrieved from the terrain database 7; the deterministic component of the attenuation associated with each cell present in the mobile telephone network under examination is calculated for each terrain element;

configuration of the common channels for the cells controlled by the NodeB_MC object 13; a transmitted power value, determined according to the configuration file 6, is specified for each cell and for each channel; the minimum set of common channels used comprises the pilot channel CPICH (Common Pilot CHannel), the synchronization channel SCH (Synchronization CHannel), and the primary control channel P-CCPCH (Primary Common Control Physical CHannel).

Still with-reference to FIG. 5, each step of event-based micro-simulation 102 comprises an initialization step 102*a* including the following steps:

Updating of the propagation data by the PROP object 14. In detail, the PROP object 14 calculates the statistical component of the attenuation associated with each cell present in the mobile telephone network under examination for each terrain element. The PROP object 14 then adds this statistical component, expressed in logarithmic units, to the deterministic component (also expressed in logarithmic units) which it calculated previously in the step of initialization of the simulation 101;

Calculation of its own position by each UE_MC object 12. In detail, each UE_MC object 12 calculates its own position within the simulation scenario, this position being used for the whole current event-based micro-simulation. The position determination consists in the selection of one of the terrain elements belonging to the geographical, area under examination, carried out on the basis of the predicted traffic distribution for a given service S associated with the UE_MC object 12 in question. Specifically, each terrain element (m, n) is associated with a selection probability $Pr_s(m,n)$ which, according to the invention, is defined, for the service S, by the following expression:

$$Pr_s(m, n) = \frac{t_s(m, n)}{T_s}$$

where the term $t_s(m,n)$ denotes the value of the traffic for the terrain element (m,n) supplied by the traffic matrix for the service S, while the term $T_s$ denotes the sum of all the traffic matrix elements of the service S associated, with the terrain elements belonging to the area under examination. The traffic matrices associated with the different services are contained in the terrain data database 7 described previously. Each UE_MC object 12 also selects the initial transport format, for both the uplink and the downlink, from the available transport formats provided in the configuration file 6;

initialization of the data structures used for simulating the radio resource management, carried out by the RNC_MC object 11. In detail, the RNC_MC object 11 sets the number of active links for each cell to 0, sets the current value of the load factor for each cell to 0, sets the power transmitted by each cell to a value obtained by adding together the powers associated with the common channels, and sets the number of codes allocated for each cell to a value obtained by adding together the number of codes allocated to the common channels only;

execution by each UE_MC object 12 of a set of procedures for simulating the power measurements in the common channels carried out by the mobile terminals in the UMTS system. In detail, the UE_MC object 12 obtains from the RLM module 15 the value of power received on the pilot channel CPICH associated with each cell in the mobile telephone network for which a calculated attenuation value exists in relation to the terrain element in which the UE_MC object 12 is located. On the basis of comparative measurements, the UE_MC object 12 determines its own "best CPICH" cell. The "best CPICH" cell of each UE_MC object 12 is the cell with which is associated the highest power value in respect of the reception of the pilot channel CPICH. Specifically, if $CPICH\_RSCP_j$ denotes the power received on the pilot channel by a cell j, the UE_MC object 12 determines its own best CPICH cell by using the following known relation:

$$CPICH\_RSCP_k \geqq CPICH\_RSCP_j$$

where k is the best. CPICH cell, while j varies in such a way as to allow for the set of power measurements made by the UE_MC object 12. The UE_MC object 12 also carries out a check of a known type on the minimum power level $CPICH\_RSCP_k$ associated with the best CPICH cell. If the following relation is true:

$$CPICH\_RSCP_k \geqq Slev\_CPICH$$

the reference to the UE_MC object 12 in question is added to the list of mobile terminals to be activated otherwise the reference to the UE_MC object 12 in question is added to the list of mobile terminals out of service 26, with the note "no coverage". Slev_CPICH is a characteristic parameter of the UE_MC object 12 and is defined in the configuration file 6.

The UE_MC object 12 also determines its own "candidate set", in other words the set of candidate cells for macrodiversity, on the basis of the measures made. This set consists of cell k (best CPICH cell) and all cells for which the following known expression is true:

$$CPICH\_RSCP_j \geqq CPICH\_RSCP_k - \Delta_{SH}$$

where $CPICH\_RSCP_j$ denotes the power received by the UE_MC object 12 in question at the cell j (expressed in logarithmic units); $RSCP_k$ denotes the power received by the UE_MC object 12 in question at the best CPICH cell (expressed in logarithmic units); and $\Delta_{SH}$ is a radio resource management parameter, called the macrodiversity window.

The step of initialization 102*a* of the event-based micro-simulation also comprises a step of positioning a radio resource management event controlled by the simulation engine 10 in the list of events. This event will subsequently be processed by the RNC_MC object 11.

Each step of event-based micro-simulation 102 can comprise one or more iterative steps of processing radio resource management events, whose sequence is determined by the event scheduler module incorporated in the simulation engine 10. For example, each step of event-based micro-simulation 102 can comprise (see FIG. 5):

- a step of processing an admission control event 103, carried out by the RNC_MC object 11. This admission control event comprises the activation, controlled by the admission control procedures and/or algorithms, of a set of UE_MC objects 12 which simulate the mobile terminals present in the network (the criteria for determining this group of UE_MC objects will be described subsequently);
- a first step of processing a power control event 104, carried out by the NodeB_MC objects 13 and by the UE_MC objects 12 active in step 104;
- a first step of checking the power convergence condition 105, carried out by the RNC_MC object 11.

If the first step of checking the power convergence condition 105 has a negative outcome, the simulation engine 10 causes the first step 104, to be executed. Conversely, if the first step of checking the power convergence condition 105 has a positive outcome, the simulation engine 10 causes the execution of:

- a step of processing a congestion control event 106 carried out by the RNC_MC object 11. During this congestion control event, a subset of active mobile terminals may be taken out of service according to the congestion control procedures and/or algorithms;
- a second step of processing a power control event 107, carried out by the NodeB_MC objects 13 and by the UE_MC objects 12 active in step 106;
- a second step of checking the power convergence condition 108, carried out by the RNC_MC object 11.

If the second step of checking the power convergence condition 108 has a negative outcome, the simulation engine 10 causes the second step 107 to be executed. Conversely, if the second step of checking the power convergence condition 108 has a positive outcome, the simulation engine 10 causes the execution of:

- a step of processing an outage control event 109, carried out by the RNC_MC object 11. During this step 109, a subset of active mobile terminals may be taken out of service according to the outage control procedures and/or algorithms;
- a third step of processing a power control event 110, carried out by the NodeB_MC objects 13 and by the UE_MC objects 12 active in step 109;
- a third step of checking the power convergence condition 111, carried out by the RNC_MC object 11.

If the third step of checking the power convergence condition 111 has a negative outcome, the simulation engine 10 causes the third step 110 to be executed. Conversely, if the third step of checking the power convergence condition 111 has a positive outcome, the simulation engine 10 causes the execution of:

- a step of collecting and processing the statistical results 112, which produces at the output a set of statistical results 113, stored in the simulation database 8;
- a step of checking the attainment of a total number of users to be activated 115. This number corresponds to the total number of users to be activated $N_{UETOT}(s)$ in the course of the simulation for each service S. Specifically, this number is contained in the configuration file 6 And can, for example, be calculated from the traffic matrices associated with each service provided by the mobile telephone network and stored in the terrain database 7.

If the step of checking the attainment of a final configuration of users 115 has a negative outcome, the simulation engine 10 causes the execution of the first step 103, which activates one or more mobile terminals in sequence (providing a new traffic distribution), these terminals being added to the number of already active mobile terminals. Conversely, if the step of checking the attainment of a final configuration of users 115 has a positive outcome, the simulation engine 10 causes the execution of:

- a step of checking the accuracy of the statistical data obtained, 116.

If the step of checking the accuracy of the statistical data obtained 116 has a positive outcome, the simulation engine 10 terminates the simulation algorithm 100 (stop); otherwise the simulation engine 10 causes the execution of a new step of event-based micro-simulation 102.

In detail, in the step of processing an admission control event 103, the RNC_MC object 11 carries out the following operations:

- it determines the number of UE_MC objects 12 to be activated for each service according to the current network conditions. The current network conditions are described by the system resources map 30 and by the set of radio resource management parameters 48, 49. In particular, according to the invention, the RNC_MC object 11 uses the following procedure to calculate the number of UE_MC objects 12 to be activated:

1) it determines the number of mobile terminals already activated in preceding admission control events, in the course of the current micro-simulation. For each service, this number corresponds to the sum of the number of mobile terminals in service $N_{UESERV}(s)$ and the number of mobile terminals out of service $N_{UEOUT}(s)$;

2) it extracts from the configuration file 6, for each service, a minimum number $N_{UEMIN}(s)$ and a maximum number $N_{UEMAX}(s)$ of users, by means of which it is possible to set, respectively, a maximum and a minimum limit for the set of UE_MC objects 12 associated with the service s to be activated, during the single admission control event;

3) it extracts from the configuration file 6 the total number of users to be activated $N_{UETOT}(s)$.

In particular, the total number of users to be activated $N_{UETOT}(s)$ in the course of the simulation can be calculated, for example, by using the following expression:

$$N_{UETOT}(s)=\gamma(s)\cdot T_s$$

where $T_s$ represents the sum of all the elements of the traffic matrix associated with this service, while γ(s) is a network configuration parameter contained in the configuration file 6, used for determining the total traffic generated in the course of the simulation, with the application of a multiplication factor to the reference traffic associated with the terrain database 7;

4) for each cell j, it extracts from the corresponding list of Cell Context objects the current value η(j) of the load factor of the uplink and the admission control threshold $\eta_{lim}(j)$ for this link;

5) for each cell j, it extracts from the corresponding list of Cell Context objects the current value P(j) of the power transmitted in the downlink and the power threshold $P_{lim}(j)$ for this link;

6) it calculates the value of the total load indicator H for the network, according to the following expression:

$$H = 1 - \frac{1}{N_{cells}} \cdot \min\left\{\sum_{j=1}^{N_{cells}} \frac{\eta_{lim}(j) - \eta(j)}{\eta_{lim}(j)}, \sum_{j=1}^{N_{cells}} \frac{P_{lim}(j) - P(j)}{P_{lim}(j)}\right\}$$

where $N_{cells}$ is the number of cells present in the simulated network;

7) it calculates the number of users to be activated $N_{UESTEP}(s)$, for example by using the following expression:

$$N_{UESTEP}(s) = \min\left\{\begin{matrix} N_{UEMIN}(s) + (1-H)\cdot[N_{UEMAX}(s) - N_{UEMIN}(s)], \\ N_{UETOT}(s) - N_{UESERV}(s) - N_{UETOT}(s) \end{matrix}\right\}$$

The sequence of the values of $N_{UESTEP}(S)$ is calculated in the course of the first event-based micro-simulation and is then stored. In the subsequent event-based micro-simulations, the sequence of values of $N_{UESTEP}(s)$ calculated in the first event-based micro-simulation is retrieved from the store.

The RNC_MC object 11 also carries out the further operations of:

- selecting in a random way, for each service, the UE_MC objects 12, numbering $N_{UESTEP}(s)$, to be activated from the $N_{UETOT}(s)$ UE_MC objects 12 to be activated;
- considering the set of cells belonging to the corresponding "candidate set" for each UE_MC object 12;
- simulating the admission control procedures and/or algorithms for each of the cells belonging to the "candidate set". For the UMTS standard, these procedures and/or algorithms comprise, for example, the following known checks:

1) a check of the pilot channel reception quality, using the following expression:

$$\frac{\text{CPICH\_RSCP}_j}{RSSI} \geq \text{Squal\_CPICH}$$

where RSSI denotes the total received wideband power in the downlink, while $\text{CPICH\_RSCP}_j$ denotes the power received in the CPICH channel. Both of these measurements are simulated in the second UE_PHY module 17 by interaction with the RLM object 15. Squal_SCH is a network configuration parameter characteristic of the UE_MC object 12 and is contained in the configuration file 6;

3) a check, of the load factor of the uplink, using the following expression:

$$\eta(j)+\Delta\eta<\eta_{lim}(j)$$

where η(j) is the current value of the load factor in the uplink, calculated from the noise increase factor, while $\eta_{lim}(j)$ is the admission control threshold for the uplink. Both of these parameters are taken from the list of Cell Context objects for the cell j. Δη represents the load estimate associated with the link requested by the mobile terminal and is a network configuration parameter characteristic of the transport format associated with the UE_MC object 12 for the uplink. If the check yields a negative outcome for the transport format currently assigned to the UE_MC object 12 in question, and if a transport format for the uplink having a lower bit rate than the current one has been defined for the UE_MC object 12 in question, the check of the load factor is repeated with the value Δη assumed to be that of the transport format having a lower bit rate. The process is iterated until the check yields a positive outcome, or until the transport formats defined for the UE_MC object 12 in question for the uplink have been exhausted.

4) check of the power transmitted in the downlink, using the following expression:

$$P(j)+\Delta P<P_{lim}(j)$$

where P(j) is the current value of the power transmitted in the downlink by the cell j and $P_{lim}(j)$ is the admission control threshold for the power of the downlink. Both of these parameters are taken from the list of Cell Context objects for the cell j. Additionally, ΔP represents the power estimate associated with the link requested by the mobile terminal, and is a network configuration parameter characteristic of the transport format associated with the UE_MC object 12 for the downlink. If the check yields a negative outcome for the transport format currently assigned to the UE_MC object 12 in question, and if a transport format for the downlink having a lower bit rate than the current one has been defined for the UE_MC object 12 in question, the check of the load factor is repeated with the value ΔP assumed to be that of the transport format having a lower bit rate. The process is iterated until the check yields a positive outcome, or until the transport formats defined for the UE_MC object 12 in question for the downlink have been exhausted.

5) a check of the number of codes allocated in the downlink, using the following expression:

$$N_{COD}(j)+n_{UECOD}<N_{CODMAX}(j)$$

where $N_{COD}(j)$ is the current number of codes allocated in the downlink for the cell j and $N_{CODMAX}(j)$ is the admission control threshold relating to the maximum number of available codes. Both of these parameters are taken from the list of Cell Context objects for the cell j. Additionally, $n_{UECOD}$ represents the number of codes requested by the service associated with the link requested by the UE_MC object 12 in question. $n_{UECOD}$ is a network configuration parameter characteristic of the transport format associated with the UE_MC object 12 for the downlink. If the check yields a negative outcome for the transport format currently assigned to the UE_MC object 12 in question, and if a transport format for the downlink having a lower bit rate than the current one has been defined for the UE_MC object 12 in question, the check of the load factor is repeated with the value $n_{UECOD}$ assumed to be that of the transport format having a lower bit rate. The process is iterated until the check yields a positive outcome, or until the transport formats defined for the UE_MC object 12 in question for the downlink have been exhausted.

The cells for which all the checks listed above have had a positive outcome, for one of the transport formats in question, are considered by the RNC_MC object 11 to be in macrodiversity mode with the UE_MC object 12 in question. The set of cells in macrodiversity mode is denoted by the term “active set”.

The cells for which at least one of the checks listed above has yielded a negative outcome, for all transport formats in question, are not included by the RNC_MC object 11 in the active set of UE_MC objects 12 in question. In this case, for each of these cells, the RNC_MC object 11 inserts into the list of blocked links 47 a reference to the UE_MC object 12 in question, together with a code which identifies the check (or set of checks) whose outcome was negative.

Also during the step of processing an admission control event 103, the RNC_MC object 11 carries out the further operation of sending messages to the NodeB_MC objects 13 and the UE_MC objects 12 in such a way as to create a dedicated channel in the uplink between a transmitter 18 of the UE_MC object 12 and a receiver 24 of the NodeB_MC object 13, for each of the cells considered to be in macrodiversity mode, and a dedicated channel in the downlink between a receiver 19 of the UE_MC object 12 and a transmitter 23 of the NodeB_MC object 13, for each of the cells considered to be in macrodiversity mode.

The UE_MC objects 12 for which the checks have been carried out and which have at least one cell in each of their active sets are considered by the RNC_MC object 11 to be active terminal mobiles. A reference to these objects is inserted by the RNC_MC object 11 into the list of active, mobile terminals 60. The RNC_MC object 11 also inserts a reference to the UE_MC objects 12 considered to be active in each of the lists of reference to active mobile terminals contained in the lists of Cell Context objects relating to the cells in macrodiversity mode with the UE_MC objects 12, considered to be active.

The UE_MC object 12 for which the checks have been carried out and which have no cells in their active sets are considered by the RNC_MC object 11 to be terminals out of service; a reference to these objects is inserted by the RNC_MC object 11 into the list of mobile terminals out of service 26, and is associated with the cause “blocked by admission control”.

The first step of processing a power control event 104 comprises, according, to the invention, the following operations carried out by the UE_MC object 12:

- simulating the procedures of signal/noise ratio measurement carried out by the corresponding receiver, by interaction with the RLM object 11, for both the uplink and the downlink;
- sending a power control command, based on the measurements made, to all the transmitters connected in macrodiversity mode to the receiver in question.

Specifically, two types of power control command are defined:

a) an UP command, sent when the measured signal/noise ratio is lower than the target signal/noise-ratio, defined for the transport format associated with the link in question;

b) a DOWN command, sent when the measured signal/noise ratio is higher than the target signal/noise ratio defined for the transport format associated with the link in question. Each transmitter therefore receives one or more power control commands from the receivers linked to it. On the basis of these commands it varies the transmission power associated with each link, according to the following method found in the UMTS specifications:

a) if it receives at least one DOWN command, it decreases the transmission power by a value equal to the step defined for the transport format associated with the link in question. If the transmitted power value, after application of the reduction, is lower than the minimum value specified for the link in question, the transmitted power is set to the minimum value, calculated by subtracting the value of the dynamics of the transmitter in question (the mobile terminal end or Node B end) from the maximum value specified for the transmitter;

b) if all of the commands it receives are of the UP type, it increases the transmission power by a value equal to the step defined for the transport format associated with the link in question.

If a non-zero value of the power control command processing delay is specified for the transport format associated with the link in question, the power variation is not carried out during the current power control event the command sent by the receiver is stored and processed in one of the following power control events, selected according to the value of the processing delay.

For each link, each transmitter also stores, in a known type of vector associated with the transmitter, the values of transmitted power relating to the most recent power control events. The number of values to be stored is set by means of the configuration file 6.

In the first step of checking the power convergence condition 105, each transmitter calculates the maximum (Pmax) and the minimum (Pmin) of the power values stored in the vector associated with the transmitter. Each transmitter then calculates the difference between said maximum and minimum values and compares it with the amplitude of a convergence window set by means of the configuration file 6. If this difference is less than the amplitude of the convergence window, the convergence condition for the link in question is achieved. In this situation, the transmitter sends a message to the RNC_MC object 11.

The RNC_MC object 11 monitors, for both the uplink and the downlink, the number of messages received at the end of each first step of checking the power control convergence condition 105. If the number of messages received is greater for each of the two links than a threshold determined in percentage terms with respect to the total number of active transmitters for the link in question, and set by means of the configuration file 6, the RNC_MC object 11 inserts into the queue of events a power control event which the simulation engine 10 proceeds to execute, interrupting the sequence of power control events. Otherwise, the simulation engine 10 causes the execution of a new power control event (first step 104).

In the step of processing a congestion control event 106, the RNC_MC object 11 simulates the congestion control procedures and/or algorithms. For the UMTS standard, for example, the RNC_MC object 11 carries out the following operations:

a check of the load factor in the uplink:

$$\eta(j)+\Delta\eta<\eta_{lim}(j)$$

where $\eta(j)$ is the current value of the load factor in the uplink, calculated from the noise increase factor, while $\eta'_{lim}(j)$ is the congestion control threshold, relative to the load, for the uplink. Both of these parameters are taken from the list of Cell Context objects for the cell j;

a check of the power transmitted in the downlink:

$$P(j)<P'_{lim}(j)$$

where P(j) is the current value of the power transmitted in the downlink by the cell j, while $P'_{lim}(j)$ is the congestion control threshold, relative to the power, in the downlink. Both of these parameters are taken from the list of Cell Context objects for the cell j.

If at least one of the two checks yields a negative outcome; this means that the cell j in question is in overload conditions. In this case, the RNC_MC object 11 selects a group of UE_MC objects 12, including active ones, belonging to the service class with less stringent requirements, and sends them a message which informs them of the congestion situation, with details of the critical link in terms of the congestion (the uplink, the downlink or both). The content of the group, in other words the number of mobile terminals which, make it up, is set by the configuration file 6. When each UBE_MC object 12 receives, the message informing it of the congestion, it attempts to select a transport format having a lower bit rate than that of the critical link: if this transport format is available, it selects it as the new transport format for the link in all the cells belonging to its active set; otherwise the UE_MC object 12 removes the congested cell from its active set.

In this case, the RNC_MC object 11 inserts into the list of blocked links 47 a reference to the blocked link, together with a code which identifies the link which has given rise to the congestion. If the UE_MC object 12 in question has no other cells in its active set, it enters the out-of-service condition. In this situation, the RNC_MC object 11 inserts a reference to this mobile terminal into the list of mobile terminals out of service 26 with which it associates the cause "blocking due to congestion control". The mobile terminal is then removed from the list of active mobile terminals 60.

The second step of processing a power control event 107 and the second step of checking the power convergence condition 108 are entirely similar to the first steps 104 and 105 described previously. In particular, if the second step of checking the power convergence condition 108 has a positive outcome, in other words if convergence is achieved, the RNC_MC object 11 inserts into the queue of events an outage control event which the simulation engine 10 proceeds to execute, interrupting the sequence of power control events. If the opposite is true (negative outcome), the simulation engine 10 causes the execution of the second step 107.

In the step of processing an outage control event 109, the RNC_MC object 11 sends to all the active UE_MC objects 12 (in other words those having active sets) a message which triggers, for each UE_MC object 12, the outage control procedures and/or algorithms specified by the UMTS standard. For the UMTS standard, these procedures and/or algorithms require each UE_MC object 12 to carry out the following operations:

- a check that the difference in dB between the maximum power associated with the UE_MC object 12 in question and the power transmitted in the uplink is greater than a given threshold, set by means of the configuration file 6;
- a check that the difference in dB between the signal/noise ratio in the downlink and the target signal/noise ratio specified for the requested service is either positive or negative, but smaller in absolute terms than a given threshold, set by means of the configuration file 6.

If at least one of the two checks yields a negative outcome, the UE_MC object 12 attempts to select a transport format having a lower bit rate, in respect of outage, than that of the critical link: if this transport format is available, it selects it as the new transport format for all the cells belonging to its active set; otherwise it enters the out-of-service condition.

In this case, the RNC_MC object 11 inserts into the list of mobile terminals out of service 26 a reference to this mobile terminal, associating it with the cause "blocking due to outage control". The mobile terminal is then removed from the list of active mobile terminals 60.

The third step of processing a power control event 110 and the third step of checking the power convergence condition 111 are entirely similar to the first steps 104 and 105. In particular, if the third step of checking the power convergence condition 111 has a positive outcome, in other words if convergence is achieved, the RNC_MC object 11 inserts into the queue of events an event of collecting and processing the statistical results 112, which the simulation engine 10 proceeds to execute, interrupting the sequence of power control events.

If the opposite is true (negative outcome), the simulation engine 10 causes a new execution of the third step 110.

In the step of collecting and processing the statistical results 112, the RNC_MC object 11 sends to all the simulation objects a message which starts the collection of the statistical results. For each type of simulated value, a dedicated statistics processing module is defined, as indicated by the reference number **8*a* in FIG. 1**, and proceeds to collect the statistical results associated with said value.

The statistical results associated with a value can, for example, consist of the mean, the median, the variance, the standard deviation, the probability distribution and the cumulative distribution.

In detail, each simulation object (including the RNC_MC object 11) sends to the data processing modules **8*a* the statistical results 113 relating to simulated values which are particularly significant for the object. For example, the UE_MC objects 12 send statistical results 113 for the following values: the transmission power in the uplink, the signal/noise ratio in the downlink, the bit rate of the uplink, the bit rate of the downlink, the value of the Ec/Io parameter of the pilot channel CPICH (which expresses the signal/noise ratio for the pilot channel CPICH), and the current size of the corresponding active set. The NodeB_MC objects 13 send, for each cell associated with them, statistical results 113 for the following values: total transmitted power in the downlink, load factor for the uplink, inter-cell interference factor for the uplink, and transmitted power for each downlink. The RNC_MC object 11 send statistical results 113** for the following values: number of mobile terminals blocked by admission control in the course of the simulation, number of mobile terminals blocked by congestion control in the course of the simulation, number of mobile terminals blocked by outage control in the course of the simulation, and signal/noise ratio for each uplink.

The data processing modules **8*a* receive the statistical results 113 for the various simulated values, and use these to calculate an indicator of accuracy for each value. The accuracy indicators can be defined, for example, in terms of confidence intervals associated with the statistical results or with a subset of the results, according to known methods such as those described in J. P. C. Leijen, Statistical Techniques in Simulation, Dekker 1974. The size of the confidence intervals is defined in the configuration file 6**. The accuracy indicators can also be defined, for example, as indicators of stability of the statistical data. For example, a stability indicator δX can be defined for the mean of a value X at the end of the micro-simulation-based on n events, according to the following expression:

$$\delta X = E_n\{X\} - E_{n-1}\{X\}$$

where $E_n\{X\}$ denotes the mean of the value X determined at the end of the simulation n, while $E_{n-1}\{X\}$ denotes the mean of the value X determined at the end of the simulation n−1.

These accuracy indicators are then stored in the simulation database 8, together with the statistical data.

Advantageously, the information provided by these accuracy indicators can be used to minimize the simulation time, while providing full control of the accuracy and reliability of the results.

In the step of checking the accuracy of the resulting statistical data 116, the simulation engine 10 compares each accuracy indicator obtained in the step of collecting and processing the statistical results 112 with a corresponding predetermined accuracy threshold defined in the configuration file 6.

If this accuracy threshold is exceeded, the simulation engine 10 terminals the simulation algorithm 100 (stop); otherwise the simulation engine 10 causes the execution of a new step of event-based micro-simulation 102.

Figure 6:
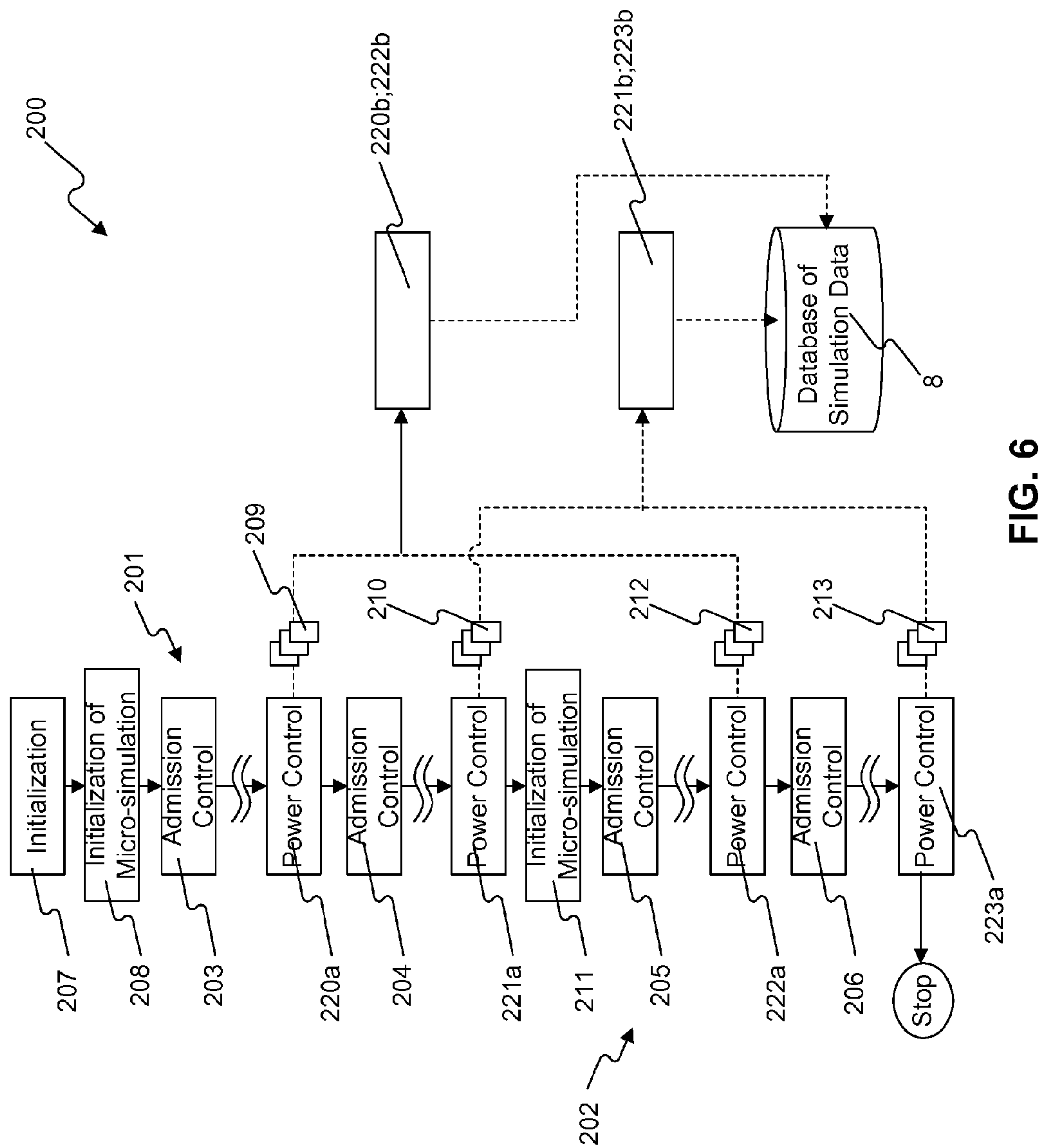

FIG. 6 shows in a flow diagram an example of the operation of the simulation algorithm according to the invention.

In the example in FIG. 6, the simulation algorithm 200, according to the invention, comprises a first and a second event-based micro-simulation 201 and 202.

More specifically, the simulation algorithm 200 starts with a step of initialization of the simulation 207.

The simulation algorithm 200 then proceeds with the execution of the first event-based micro-simulation 201 in which, after a step of initialization of the micro-simulation 208, a first admission control event 203 is processed. In the first admission control event 203, the distribution of n1 mobile terminals in the simulation scenario (first traffic scenario) is specified, these terminals corresponding to n1 UE_MC objects 12 and being divided if necessary into groups belonging to different services.

The first event-based micro-simulation 201 then proceeds with the processing of a first power control event 220*a*, continuing with the check of the power convergence condition and the collection and processing 220*b* of first statistical results 209 relating to the n1 mobile terminals.

The simulation algorithm 200 then processes a second admission control event 204, in which n2 mobile terminals (second traffic scenario) are distributed in the simulation scenario, corresponding to n2 UE_MC objects 12, divided if necessary into groups belonging to different services. The n2 groups mobile terminals are added to the n1 mobile terminals distributed previously.

The first event-based micro-simulation 201 then proceeds with the processing of a second power control event 221*a*, continuing with the check of the power convergence condition and the collection and processing 221*b* of second statistical results 210 relating to n1+n2 users.

The simulation algorithm 200 then proceeds with the execution of the second event-based micro-simulation 202 which is entirely similar to the first event-based micro-simulation 201.

specifically, the second event-based micro-simulation 202 comprises: a step of initialization of the micro-simulation 211; the processing of a first admission control event 205, in which n1 mobile terminals (first traffic scenario) are distributed in the simulation scenario, corresponding to n1 UE_MC objects 12, divided if necessary into groups belonging to different services; the processing of a first power control event 222*a*; the checking of the power convergence condition; the collection and processing 222*b* of first statistical results 212 relating to the n1 users; and the processing of a second admission control event 206, in which n2 mobile terminals are 25 distributed in the simulation scenario, corresponding to n2 UE_MC objects 12, divided if necessary into groups belonging. to different. services. The n2 mobile terminals are added to the n1 mobile terminals distributed previously, thus forming a second traffic scenario consisting of n1+n2 users.

The second event-based micro-simulation 202 then proceeds with the processing of a second power control event 223*a*, the checking of the power convergence condition, and the collection and processing 223*b* of second statistical results 213 relating to n1+n2 users.

The simulation algorithm 200 therefore makes it possible to evaluate jointly a first traffic scenario relating to n1 mobile terminals and a second traffic scenario relating to n1+n2 mobile terminals. This result is obtained by providing to separate modules dedicated to the processing of the statistical results relating to n1 and to n1+n2 mobile terminals respectively.

Specifically, a first module, associated with the first traffic scenario, processes jointly the first statistical results 209 made available after the event of collecting the statistical results for the first event-based micro-simulation 201 and the second statistical results 212 made available after the event of collecting the statistical results for the second event-based micro-simulation 202, to obtain performance indicators for the first traffic scenario.

A second module, associated with the second traffic scenario, processes jointly the second statistical results 210 made available after the event of collecting the statistical results for the first event-based micro-simulation 201 and the second statistical results 213 made available after the event of collecting the statistical results for the second event-based micro-simulation 202, to obtain performance indicators for the second traffic scenario.

The performance indicators for the first and second traffic scenarios are stored in the simulation database 8.

The advantages of the method of evaluating the performance of a multi-service mobile telephone network according to the invention are evident from the above description.

In particular, it should be emphasized that the method of evaluation according to the invention makes it possible to simulate the radio resource management procedures and/or algorithms with adequate accuracy and reliability, while minimizing the time required for the simulation.

Furthermore, the method of evaluation according to the invention can simulate a plurality of traffic scenarios in a single simulation while providing adequate control of the accuracy and reliability of the results.

Finally, the method of evaluation described and illustrated here can clearly be modified and varied in numerous ways, all contained within the scope of the inventive concept as defined in the attached claims.

For example, the method of evaluation according to the invention can be applied to multi-service mobile telephone networks based on standards other than the UMTS standard, such as the CDMA 2000 or GSM/EDGE standard. For this purpose, it will be necessary to redefine the simulation objects and the corresponding data structures so that they correspond to the network equipment and mobile terminal equipment provided by the system to be simulated;

to redefine the evolution of the simulation, in order to model the behavior of the radio resource management algorithms provided by the type of mobile telephone network to be simulated.

The invention claimed is:

1. A method for evaluating the performance of a mobile telephone network, comprising the steps of:

simulating a first configuration of said mobile telephone network;

simulating a second configuration of said mobile telephone network, said first and second configurations of said mobile telephone network being statistically independent of each other, said first and second configurations being simulated in the same mobile telephone network, each of said simulation steps comprising the steps of:

specifying a total number of users to be simulated, determining a sequence of activation of user blocks included in said total number of users to be simulated, activating said user blocks in succession until said total number of users to be simulated is reached, each user block indicating a traffic distribution, and processing at least one radio resource management event relating to the traffic distribution associated with each currently activated user block;

processing jointly statistical results generated using each of said simulation configurations; and repeating said steps of simulating said mobile telephone network until a predetermined accuracy threshold is reached for each simulated network value.

2. The method of evaluating according to claim 1, wherein each activated user block comprises at least one user.

3. The method of evaluating according to claim 1, wherein said step of processing at least one radio resource management event comprises the step of:

executing at least one radio resource management algorithm.

4. The method of evaluating according to claim 3, wherein said radio resource management algorithm comprises an admission control algorithm.

5. The method of evaluating according to claim 4, comprising the steps of:

detecting that at least one admission control threshold has been exceeded for at least one of the users belonging to the currently activated user block; and taking said user out of service.

6. The method of evaluating according to claim 3, wherein said radio resource management algorithm comprises a congestion control algorithm.

7. The method of evaluating according to claim 6, comprising the steps of:

detecting that at least one congestion control threshold has been exceeded for at least one of the users belonging to the currently activated user block; and taking said user out of service.

8. The method of evaluating according to claim 3, wherein said radio resource management algorithm comprises an outage control algorithm.

9. The method of evaluating according to claim 8, comprising the steps of:

detecting that at least one power threshold for the outage control has been exceeded for at least one of the users belonging to the currently activated user block; and taking said user out of service.

10. The method of evaluating according to claim 1, wherein said step of repeating said steps of simulating said mobile telephone network comprises:

a step of collecting and processing statistical results; and a step of checking the accuracy of the resulting statistical data.

11. The method of evaluating according to claim 10, wherein said step of collecting and processing statistical results comprises the steps of:

collecting statistical results relating to simulated network values; and obtaining at least one accuracy indicator for each of said simulated network values.

12. The method of evaluating according to claim 11, wherein said at least one accuracy indicator comprises at least one parameter selected from the confidence interval of a statistical value and the stability indicator of a statistical value.

13. The method of evaluating according to claim 10, wherein said step of checking the accuracy of the resulting statistical data comprises the steps of:

comparing, for each simulated network value, said at least one accuracy indicator with the corresponding predetermined accuracy threshold; and terminating the simulation when said at least one accuracy indicator reaches said predetermined accuracy threshold.

14. Simulation equipment for simulating at least a first configuration and a second configuration of a mobile telephone network, said first and second configurations of said mobile telephone network being statistically independent of each other, and each comprising a total number of users to be simulated, comprising:

at least one object representing a network controller belonging to said mobile telephone network; said at least one object comprising:

first modules for determining a sequence of activation of user blocks included in said total number of users to be simulated;

second modules for activating said user blocks in succession until said total number of users to be simulated is reached, each user block indicating a traffic distribution; and third modules for processing at least one radio resource management event relating to the traffic distribution associated with each activated user block, wherein the at least one object is configured to process jointly statistical results generated using each of said simulation configurations;

wherein said first and second configurations are simulated in the same mobile telephone network; and wherein the at least one object is configured to repeat simulating said mobile telephone network until a predetermined accuracy threshold is reached for each simulated network value.

15. The simulation equipment, according to claim 14, wherein said at least one object comprises data structures for supporting the processing of said at least one radio resource management event, said data structures comprising:

a list of activatable users;

a list of active users; and a group of lists of users out of service; and a map of the system resources.

16. The simulation equipment according to claim 15, wherein said map of the system resources comprises a plurality of structures, each representing a transceiver device belonging to said mobile telephone network, each structure comprising a reference to the corresponding transceiver device and a list of cell context objects, one for each cell controlled by said transceiver device.

17. The simulation equipment according to claim 16, wherein each cell context object comprises groups of radio resource management parameters.

18. The simulation equipment, according to claim 16, wherein said groups of parameters comprise at least one parameter selected from: a load threshold for admission control, a load threshold for congestion control, and a power threshold for outage control.

19. The simulation equipment according to claim 14, comprising a simulation engine comprising an event scheduler module for specifying the sequence of operations performed by said simulation equipment.

20. A non-transitory computer readable medium encoded with a program comprising program codes, wherein the program, when loaded into a memory of at least one electronic computer and executed by said at least one electronic computer, implements a method for evaluating the performance of a mobile telephone network, wherein the method comprises:

simulating a first configuration of said mobile telephone network;

simulating a second configuration of said mobile telephone network, said first and second configurations of said mobile telephone network being statistically independent of each other, said first and second configurations being simulated in the same mobile telephone network, each of said simulation steps comprising the steps of:

specifying a total number of users to be simulated, determining a sequence of activation of user blocks included in said total number of users to be simulated, activating said user blocks in succession until said total number of users to be simulated is reached, each user block indicating a traffic distribution, and processing at least one radio resource management event relating to the traffic distribution associated with each currently activated user block;

processing jointly statistical results generated using each of said simulation configurations; and repeating said steps of simulating said mobile telephone network until a predetermined accuracy threshold is reached for each simulated network value.

21. The non-transitory computer readable medium according to claim 20, wherein each activated user block comprises at least one user.

22. The non-transitory computer readable medium according to claim 20, wherein said step of processing at least one radio resource management event comprises the step of:

executing at least one radio resource management algorithm.

23. The non-transitory computer readable medium according to claim 22, wherein said radio resource management algorithm comprises an admission control algorithm.

24. The non-transitory computer readable medium according to claim 23, wherein the method comprises the steps of:

detecting that at least one admission control threshold has been exceeded for at least one of the users belonging to the currently activated user block; and taking said user out of service.

25. The non-transitory computer readable medium according to claim 22, wherein said radio resource management algorithm comprises a congestion control algorithm.

26. The non-transitory computer readable medium according to claim 25, wherein the method comprises the steps of:

detecting that at least one congestion control threshold has been exceeded for at least one of the users belonging to the currently activated user block; and taking said user out of service.

27. The non-transitory computer readable medium according to claim 22, wherein said radio resource management algorithm comprises an outage control algorithm.

28. The non-transitory computer readable medium according to claim 27, wherein the method comprises the steps of:

detecting that at least one power threshold for the outage control has been exceeded for at least one of the users belonging to the currently activated user block; and taking said user out of service.

29. The non-transitory computer readable medium according to claim 20, wherein said step of repeating said steps of simulating said mobile telephone network comprises:

a step of collecting and processing statistical results; and a step of checking the accuracy of the resulting statistical data.

30. The non-transitory computer readable medium according to claim 29, wherein said step of collecting and processing statistical results comprises the steps of:

collecting statistical results relating to simulated network values; and obtaining at least one accuracy indicator for each of said simulated network values.

31. The non-transitory computer readable medium according to claim 30, wherein said at least one accuracy indicator comprises at least one parameter selected from the confidence interval of a statistical value and the stability indicator of a statistical value.

32. The non-transitory computer readable medium according to claim 29, wherein said step of checking the accuracy of the resulting statistical data comprises the steps of:

comparing, for each simulated network value, said at least one accuracy indicator with the corresponding predetermined accuracy threshold; and terminating the simulation when said at least one accuracy indicator reaches said predetermined accuracy threshold.

* * * * *

UNITED STATES PATENT AND TRADEMARK OFFICE

CERTIFICATE OF CORRECTION

PATENT NO. : 8,391,248 B2
APPLICATION NO. : 10/580555
DATED : March 5, 2013
INVENTOR(S) : Ferrato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1568 days.

Signed and Sealed this
Twenty-third Day of December, 2014

Michelle K. Lee
*Deputy Director of the United States Patent and Trademark Office*